United States Patent
Biswas et al.

(10) Patent No.: US 8,924,922 B2
(45) Date of Patent: Dec. 30, 2014

(54) PRE-COMPILING HOSTED MANAGED CODE

(75) Inventors: Surupa Biswas, Bellevue, WA (US);
David L. Detlefs, Issaquah, WA (US);
Bruce T. Forstall, Kirkland, WA (US);
Raja Krishnaswamy, Redmond, WA (US); Kevin Bradley Frei, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 12/814,511

(22) Filed: Jun. 14, 2010

(65) Prior Publication Data

US 2011/0307858 A1    Dec. 15, 2011

(51) Int. Cl.
G06F 9/44        (2006.01)
G06F 9/455       (2006.01)

(52) U.S. Cl.
CPC ................................ G06F 9/45516 (2013.01)
USPC ........................................................ 717/104

(58) Field of Classification Search
CPC ..................................... G06F 8/20; G06F 8/24
USPC .......................................... 717/101, 104, 107
See application file for complete search history.

(56) References Cited

U.S. PATENT DOCUMENTS

| | | | |
|---|---|---|---|
| 6,530,075 B1 * | 3/2003 | Beadle et al. ................. | 717/114 |
| 7,213,240 B2 * | 5/2007 | Wong et al .................... | 717/148 |
| 7,493,604 B2 * | 2/2009 | Mariani ......................... | 717/148 |
| 8,010,937 B2 * | 8/2011 | Bertelrud et al. ............. | 717/101 |
| 2004/0030768 A1 * | 2/2004 | Krishnamoorthy et al. .. | 709/223 |
| 2005/0028155 A1 | 2/2005 | Jung | |
| 2005/0114685 A1 * | 5/2005 | Blinick et al. ................ | 713/191 |
| 2005/0132179 A1 * | 6/2005 | Glaum et al. ..................... | 713/1 |
| 2008/0098368 A1 * | 4/2008 | Biswas et al. ................. | 717/148 |
| 2009/0077573 A1 | 3/2009 | Moorthy et al. | |
| 2010/0095284 A1 * | 4/2010 | Herring et al. ................ | 717/148 |

OTHER PUBLICATIONS

Michaelf., "Linux and Windows Interoperability: On the Metal and On the Wire", Retrieved at <<http://port25.technet.com/archive/2007/08/13/Interoperab-on-the-metal-and-on-the-wire.aspx >>, Aug. 13, 2007, pp. 22.

(Continued)

Primary Examiner — Anna Deng
(74) Attorney, Agent, or Firm — Kevin Sullivan; Kate Drakos; Micky Minhas

(57) ABSTRACT

A hosted pre-compilation system is described herein that provides a way to enable ahead-of-time compilation for managed code running inside a host. The host triggers ahead-of-time compilation at application runtime, after any configuration settings are available. The host can choose which modules to compile, when to compile them, and where to persist the generated images. Upon detecting a module load, the host can trigger pre-compilation, provide the loader an existing pre-compiled image of the module, or do nothing. The runtime/platform validates the integrity of any host-supplied pre-compiled image and provides application programming interfaces (APIs) to inform the host when an image becomes invalid and fails to load. The platform also provides APIs to let the host trigger compilation of binaries at any time relevant to the host, and to generate the images either synchronously or in a background process.

20 Claims, 4 Drawing Sheets

(56) References Cited

OTHER PUBLICATIONS

Nishimura, et al., "Virtual Clusters on the Fly—Fast, Scalable, and Flexible Installation", Retrieved at <<http://ieeexplore.ieee.org/stamp/stamp.jsp?tp=&arnumber=4215422&userType=inst >>, CCGRID, Proceedings of the Seventh IEEE International Symposium on Cluster Computing and the Grid, May 14-17, 2007, pp. 8.

Whaley, John., "Joeq: A Virtual Machine and Compiler Infrastructure", Retrieved at <<http://suif.stanford.edu/papers/ivme03.pdf >>, Proceedings of the 2003 workshop on Interpreters, virtual machines and emulators, Jun. 12, 2003, pp. 9.

Joisha, et al., "A Framework for Efficient Reuse of Binary Code in Java", Retrieved at <<http://citeseerx.ist.psu.edu/viewdoc/download?doi=10.1.1.6.1313&rep=rep1&type=pdf >>, International Conference on Supercomputing, Proceedings of the 15th international conference on Supercomputing, 2001, pp. 11.

"Running the Sample Application Using AOT", Retrieved at <<http://publib.boulder.ibm.com/infocenter/realtime/v1r0/index.jsp?topic=/com.ibm.rt.doc.10/realtime/sample_running_aot.html >>, Retrieved Date: Mar. 12, 2010, pp. 3.

\* cited by examiner

PRE-COMPILING HOSTED MANAGED CODE

BACKGROUND

Many applications and libraries are distributed in an intermediate format, such as MICROSOFT™ Intermediate Language (MSIL). These intermediate language binaries (also known as managed assemblies in the case of MICROSOFT™ .NET) are typically compiled dynamically at runtime in a virtual machine environment using a Just-in-Time (JIT) compiler. An alternative to dynamic compilation is pre-compilation via Native Generation (NGen). NGen generates machine code and runtime data structures from the intermediate language and persists them in files on disk. The images produced by NGen are called Native or NGen images. Unlike JIT-compiled code, code and data structures in NGen images can be shared across processes. For libraries and frameworks that are typically shared across multiple processes, NGen is extremely useful since it minimizes the working set of each managed process. NGen therefore reduces the overall memory utilization of the system. NGen is also very useful for minimizing start up time of client-side applications.

Several managed platforms/applications are using NGen. Unfortunately, however, it is quite difficult to use NGen in these current platforms. Since NGen images are created on the end-user machine, NGen commands are typically chained through the framework/application's installer. Typically, that involves writing a custom action (such as a MICROSOFT™ WINDOWS™ Installer action) that invokes a command-line tool (ngen.exe in the case of MICROSOFT™ .NET). Custom actions are not trivial to write. Moreover, NGen images may become invalidated for a variety of reasons (such as when the corresponding libraries/assemblies are serviced/updated), and need to be regenerated each time that happens by issuing explicit commands through the command line tool.

Contemporary browsers and other applications allow plug-ins, which in general comprise hosted software code that interacts with the hosting browser/application to provide additional functionality. One reason for using plug-ins is to increase security; the hosting browser limits the actions that the hosted code (which is generally untrusted) can perform. The Internet has become very dangerous, with malicious websites often attempting to cause a user to download and run harmful code that may damage the user's computer system or destroy the user's data. Thus, web browsers often include restrictions on the code that can run, and the plug-ins that can perform actions on the user's computer system. Plug-ins increase the size of the sandbox provided by the browser, because they allow more functionality on the web while decreasing the number of untrusted applications installed. One such plug-in is MICROSOFT™ SILVERLIGHT™, which provides a platform that allows application developers to create rich web applications hosted in the browser that typically include animation, vector graphics, and/or media (e.g., audio/video) content playback. Another example plug-in is ADOBE™ FLASH™.

Virtual execution environments typically make it possible for a host application (the host itself may be written in native or managed code) to customize various aspects of the environment in which the hosted managed code runs. For example, the host can specify settings related to security (to set up a sandbox), and loading dynamically linked libraries (DLLs) (e.g., to indicate where to load DLLs from). Ahead-of-time compilers like NGen typically do not have access to these settings since they are generated as part of running the host application. For example, these settings are not typically known at install time. Current solutions expect a developer to run the host application, record the settings, and then make that information available to the compiler. Often times, there is no supported way to provide this information, and even when there is, the process is manual and tedious. As a result, hosted managed code is typically not pre-compiled, causing performance and resource usage to suffer.

SUMMARY

A hosted pre-compilation system is described herein that provides a way to enable ahead-of-time compilation for managed code running inside a host. The host triggers ahead-of-time compilation at application runtime, after any configuration settings are available. The host can choose which modules to compile, when to compile them, and where to persist the generated images. This frees the runtime from having to infer application settings, schedule the initial compilation work, and track when images become invalid and need to be regenerated. Images are generated and regenerated on demand in the context of the application that is going to use them. The hosted pre-compilation system identifies whether an application is running inside another host application, and lets the host intercept module loads. Upon detecting a module load, the host can trigger pre-compilation, provide the loader an existing pre-compiled image of the module, or do nothing. The runtime/platform validates the integrity of any host-supplied pre-compiled image and provides application programming interfaces (APIs) to inform the host when an image becomes invalid and fails to load. The platform also provides APIs to let the host trigger compilation of binaries at any time relevant to the host, and to generate the images either synchronously or in a background process. Thus, the hosted pre-compilation system makes pre-compilation possible for hosted applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
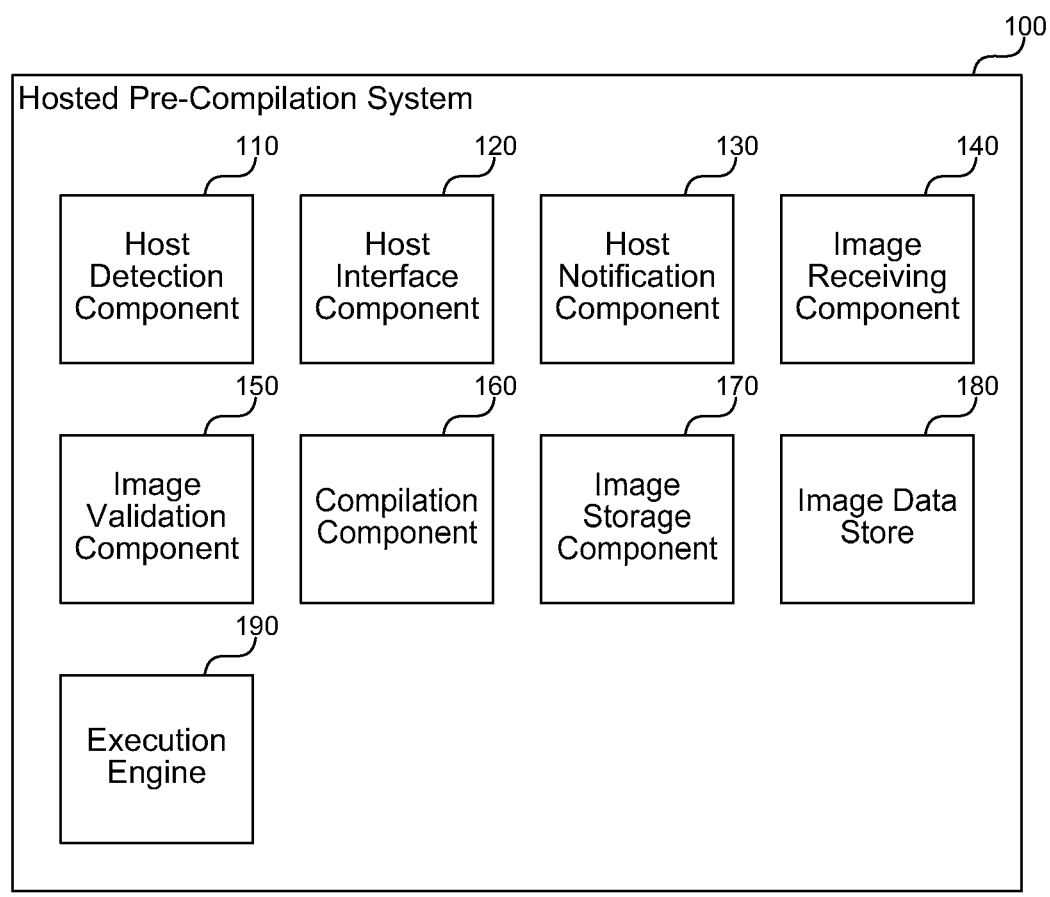
FIG. 1 is a block diagram that illustrates components of the hosted pre-compilation system, in one embodiment.

A hosted pre-compilation system is described herein that provides a way to enable ahead-of-time compilation for managed code running inside a host. The host triggers ahead-of-time compilation at application runtime, after any configuration settings are available. The host can choose which modules (e.g., DLLs) to compile, when to compile them, and where to persist the generated images. This frees the runtime from having to infer application settings, schedule the initial compilation work, and track when images become invalid and need to be regenerated. Images are generated and regenerated on demand in the context of the application that is going to use them. The hosted pre-compilation system identifies whether an application is running inside another host application, and lets the host intercept module loads. Upon detecting a module load, the host can trigger pre-compilation, provide the loader an existing pre-compiled image of the module, or do nothing. The runtime/platform validates the integrity of any host-supplied pre-compiled image and provides application programming interfaces (APIs) to inform the host when an image becomes invalid and fails to load. The platform also provides APIs to let the host trigger compilation of binaries at any time relevant to the host, and to generate the images either synchronously or in a background process.

The system can automatically pre-compile managed binaries (e.g., MSIL, Java byte code) to machine code when running inside another application host. The system provides the host application complete control over the binaries to pre-compile, the compilation policy to use, and the location where the generated images are stored. The system communicates with the host when given pre-compiled binaries are determined to be invalid (e.g., because the corresponding DLLs changed, their dependencies have changed, or the version of the platform they were built against changed). The system triggers pre-compilation in the context of the running application and thus the generated images will work correctly in the context of that application. Thus, the hosted pre-compilation system makes pre-compilation possible for hosted applications, and allows such environments to have performance on par with non-hosted environments by producing native images.

When managed code (MSIL or Java byte code, for example) is running inside another host application, a managed runtime (e.g., the MICROSOFT™ .NET Common Language Runtime (CLR)) executes a different code-path to load dependent modules (e.g., DLLs). As part of its logic to determine whether a given module has a valid pre-compiled form, the runtime loader lets the host application select a location from which to load a pre-compiled binary. The runtime validates the host-supplied binary and either loads the binary and executes code (as usual) or determines the binary is invalid and provides a callback notification to the host. The host can listen to that callback and use a runtime-provided API to trigger generation of a new (valid) pre-compiled binary. The host can trigger compilation of binaries with or without such a callback—at any time and for any set of binaries.

The generated images are completely under the host's control. The runtime is responsible for reconciling multiple versions or copies of pre-compiled binaries existing on a machine (e.g., one in the host cache, one in a machine-wide cache) and for ensuring that the loaded image is valid and up-to-date. The host is responsible for determining when to compile the managed binaries (e.g., at application install time, application update install time, when a specific image is determined to be invalid at load time, and so on), how to compile them (synchronously or asynchronously), and managing the generated pre-compiled images (the size of the store, how to quickly retrieve images from the store, when to delete or retire images from the store, and so forth).

FIG. 1 is a block diagram that illustrates components of the hosted pre-compilation system, in one embodiment. The system 100 includes a host detection component 110, a host interface component 120, a host notification component 130, an image receiving component 140, an image validation component 150, a compilation component 160, an image storage component 170, an image data store 180, and an execution engine 190. Each of these components is described in further detail herein.

The host detection component 110 determines when application code is running in a hosted environment. Applications may run by themselves (e.g., standalone) or may be executed by a hosted environment (e.g., within an application sandbox). The system 100 can be implemented within a runtime, such as the MICROSOFT™ .NET runtime, that is used for both types of applications. The host detection component 110 can detect which application type is running and execute the logic described further herein for hosted environments. Hosted environments present different circumstances because the purpose of the host is often to control security settings, accessible resources, or impose other application restrictions. The runtime performs logic to respect the host's settings, and the host detection component 110 allows the runtime to determine the presence of such a host. In some embodiments, the host may directly inform the runtime that the host has provided a hosted environment. In other cases, the runtime may automatically detect the hosted environment based on modified security or other settings.

The host interface component 120 provides an interface through which the hosted environment can invoke the system, such as to compile images from modules storing intermediate language code. For example, the host interface may include an API that allows the host to specify a path to a specific file or directory of files to be compiled from an intermediate language to native binary images for the particular machine on which the binaries are to be run. The host can use the host interface at any time, such as upon the occurrence of events that may invalidate previously compiled binary images. For example, after the host application receives a software update, the application may recompile any previously compiled binaries, or after initial installation and execution, the host may compile modules into native binary images for the first time. Those of ordinary skill in the art will recognize that the host interface component 120 may present an interface using a variety of programming common techniques and in a variety of programming languages (e.g., Component Object Model (COM) interfaces, MICROSOFT™ .NET classes, a web service, and so forth).

The host notification component 130 notifies a host upon occurrence of events related to dependent modules used by the host environment. For example, the host notification component 130 may notify the host when an image binder/loader determines that previously compiled binary images are no longer valid. Images may become invalid for a variety of reasons, such as a change in security settings, an update received for the module from which the image was compiled, an update to one or more platform binary images, an update to the host application, and so forth. The component 130 also notifies the host when loading modules so that the host can provide a path to a host-controlled image cache that stores compiled binary images. The runtime may use the cache to look for previously compiled images and in which to store freshly compiled images used by the host.

The image receiving component 140 receives from the host a path to a location that contains one or more previously compiled binary images. Allowing the host to control where images are stored allows a computer system to include multiple separate hosts operating independently on the same computer system. The host cache also isolates the host from any machine-wide cache provided by the platform runtime. Host applications often expect a higher level of isolation than normal application environments, and thus may expect a higher level of control over modules used with the host. The image receiving component receives the location where a particular host stores its binary images, and looks in the location to determine whether a binary image for a module to be loaded exists. If a binary image exists, then the image receiving component 140 invokes the image validation component 150 to determine whether the binary image is valid.

The image validation component 150 determines whether a received binary image is a valid compiled version of a dependent module related to the hosted environment. A binary image is valid when it reflects the output that would be produced by a current compilation of the dependent module using the current settings. If compilation would produce a different binary image, then the binary image is no longer valid and will be recompiled. The image validation component 150 may determine whether an image is valid in a variety of ways, such as by inventorying all of the input that goes into compiling the image and comparing timestamps that indicate whether any input parameters have changes subsequent to the last compilation of the dependent module. Input may include other modules, security or other settings, host components, and so forth. If any of these have changed, then the image validation component 150 may signal that the binary image is no longer a valid compiled version of the dependent module and invoke the compilation component 160 to produce a new binary image.

The compilation component 160 compiles software code written into a particular language into machine executable binary instructions. Compilation is used generally herein and may include multiple steps such as parsing, lexical analysis, dependency analysis, compiling, linking, and other typical build steps of a software program. The compilation component 160 starts with input in a form that is not natively executable (e.g., a programming language or intermediate code) and produces output that is natively executable by a physical or virtual machine. The compilation component 160 may store output in a file or format in the image data store 180 (e.g., with a filename related to the original dependent module file name) or other cache (e.g., the global assembly cache (GAC) or a host-controlled cache).

The image storage component 170 stores compiled binary images under control of the hosted environment. For example, the compilation component 160 may notify a host through the host notification component 130 upon producing a new binary image so that the host can direct the image storage component 170 to a location to store the binary image. The image storage component 170 communicates with the host to determine where to store compiled images. The host may also provide a storage location on startup or at another time by calling the host interface component 120.

The image data store 180 is a storage facility provided by the hosted environment for caching compiled binary images related to the hosted environment. The image data store 180 may include one or more files, file systems, databases, cloud-based storage services, or any other facility for persisting data. The image data store 180 is controlled by the host and allows the host to isolate images used with the hosted environment from other binary images that may be installed on a computer system.

The execution engine 190 provides the context in which applications and dependent modules execute. Depending on the programming language and higher-level constructs provided by the programming language, the execution engine 190 may be as simple as the operating system's execution of a stream of processor instructions or as complex as a virtual machine environment that decodes and executes instructions in a sandbox. The execution engine executes the compiled binary images provided by the system 100.

The computing device on which the hosted pre-compilation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
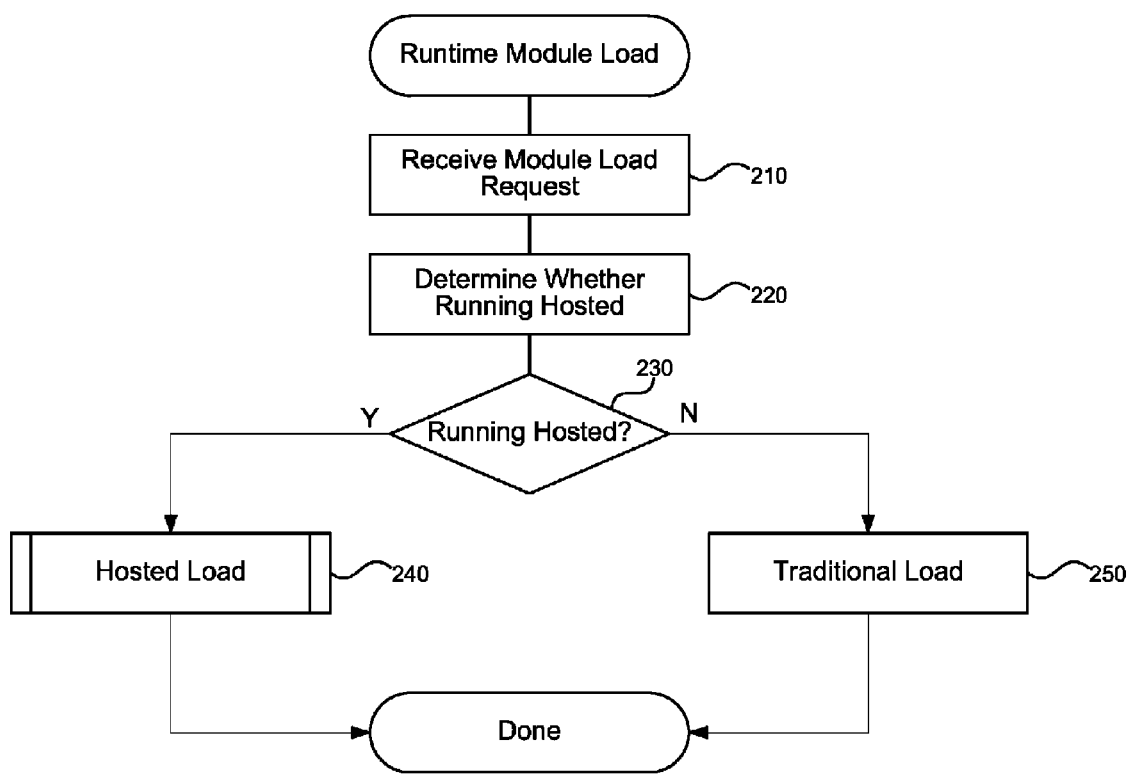
FIG. 2 is a flow diagram that illustrates processing of the hosted pre-compilation system to load modules, in one embodiment.

FIG. 2 is a flow diagram that illustrates processing of the hosted pre-compilation system to load modules, in one embodiment. Beginning in block 210, the system receives a module load request. The module load request may come from the host, from a user executing an application, or from another source. The module may be an application executable file, a dependent module (e.g., a DLL), a plug-in, or other module used by a software program. The module load request may identify the module by providing a file system path to the module or other identifier for locating the module (e.g., a globally unique identifier (GUID), ProgID, or other identifier). Continuing in block 220, the system determines whether the module is being loaded within a hosted environment. The hosted environment may configure settings within a runtime that identifies the environment as hosted. Upon running an application or loading a module, the runtime detects the event and determines whether to notify the hosted environment.

Continuing in decision block 230, if the system is operating within a hosted environment, then the system continues at block 240, else the system continues at block 250. Continuing in block 240, the system performs a hosted module load as described further with reference to FIG. 3. The hosted load typically involves searching a host-provided module cache and compiling the module under the direction of the hosted environment. Continuing in block 250, the system performs a traditional, non-hosted module load. The traditional load may include searching a global assembly cache or other machine-wide location for storing compiled binary images. After block 250, these steps conclude.

Figure 3:
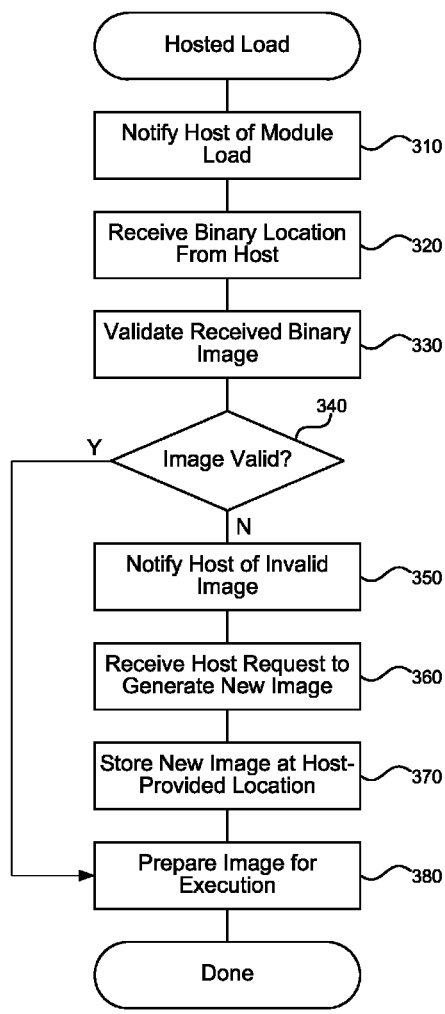
FIG. 3 is a flow diagram that illustrates processing of the hosted pre-compilation system to load a module used by a hosted environment, in one embodiment.

FIG. 3 is a flow diagram that illustrates processing of the hosted pre-compilation system to load a module used by a hosted environment, in one embodiment. Beginning in block 310, the system notifies the hosted environment of an attempt to load a module in the hosted environment. For example, the system may call a callback function registered by the host environment and pass a parameter that indicates the module that the system is loading. The system may specify the module by name, path, or other identifier. Continuing in block 320, the system receives a location for storing a binary image related to the loading module, wherein the location is managed by the hosted environment. The location may include a host-provided cache, such as in a particular file system directory managed by the hosted environment. By providing a location, the host can direct the system to find binary images at a location other than a default machine-wide location so that the host can isolate images suitable for use in the hosted environment (e.g., compiled with certain security settings or other configuration parameters).

Continuing in block 330, the system validates the stored binary image accessed at the received location. Validation may include determining the settings under which the binary image was compiled and comparing the settings to current settings, determining version information about dependencies (modules the specified image depends upon) or host modules, and so forth. The validation determines whether the stored binary image is suitable for execution. If the binary image is not suitable for execution, then the system will recompile the module to produce a new binary image. Because compilation can be a time-consuming process, particularly where many modules are to be loaded, the system strategically avoids recompilation using various heuristics.

Continuing in decision block 340, if the system determines that the stored binary image is valid, then the system jumps to block 380 and prepares the stored image for execution, else the system continues at block 350 to begin the process of producing a new, updated binary image. Upon the first run of an application, the host may not find any image at all (i.e., no previous compile has occurred). This situation is similar to finding an invalid image and is not separately illustrated. Continuing in block 350, the system notifies the hosted environment that the stored binary image is invalid. The host may respond to the notification in various ways. For example, the host may ignore the notification altogether, store the information that the binary image is invalid for a later scheduled compilation run, or immediately direct the system to recompile the module to produce a new binary image. The hosted environment receives the notification through the host interface described herein.

Continuing in block 360, the system receives a host request to generate a new binary image version of the loading module. The system may receive the request to generate the image during the notification of the invalid image or much later. For example, the host may periodically recompile any invalid images at a time determined by the host to be appropriate. The system provides the host with control of the decision to compile. Hosted environments perform a variety of tasks for a variety of purposes and may want to avoid recompiling at particular times or under particular conditions. Thus, the hosted environment may specify a later time for recompilation that is more appropriate for the host. Upon receiving the request from the host to finally generate a new binary image, the system invokes a compiler to produce the image from the particular module.

Continuing in block 370, the system stores the new binary image at a host-provided location. The location may include a host cache or other storage facility managed by the host. The host may manage the storage location using its own policies. For example, the host may invalidate all of the images stored at the location on a periodic schedule to force regeneration of the images. It is up to the host to determine why and when to produce new images.

Continuing in block 380, the system prepares the image for execution. If the stored image was valid, then the stored image is prepared for execution. If the image was newly generated by compiling, then the new image is prepared for execution. Preparation for execution varies by programming environment, language, operating system, and/or machine architecture, but may include steps such as mapping the image into memory, fixing up any branch locations, allocating memory space, and so forth. After preparation for execution, the binary image is ready to run or to be invoked by other binary images. After block 380, these steps conclude.

Figure 4:
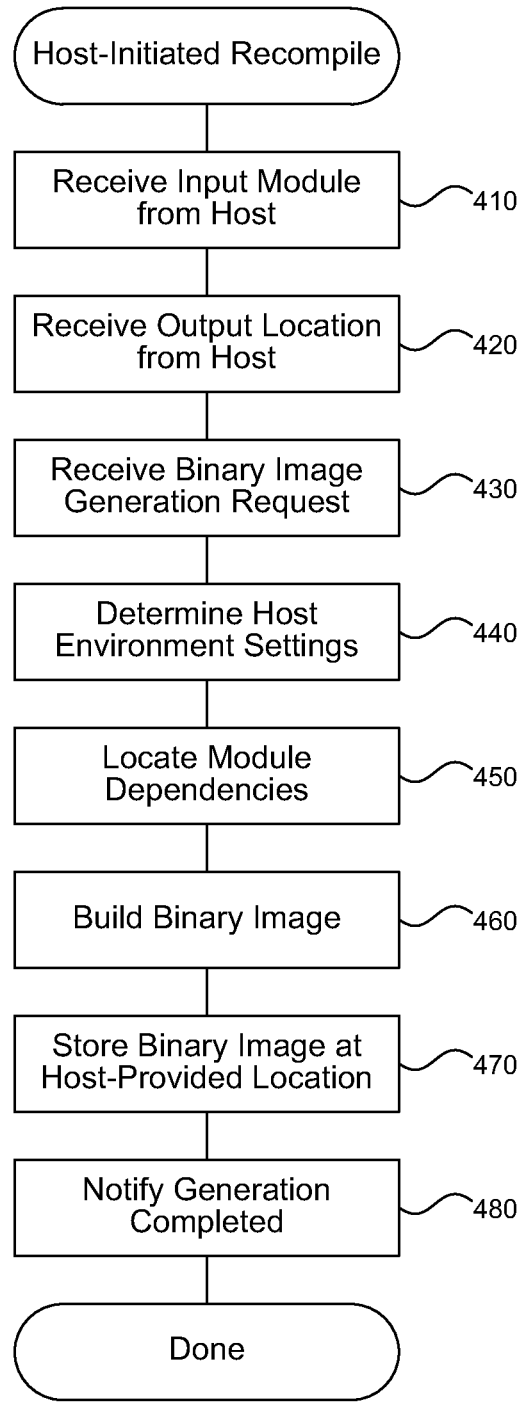
FIG. 4 is a flow diagram that illustrates processing of the hosted pre-compilation system to perform a host-initiated recompile of dependent modules, in one embodiment.

FIG. 4 is a flow diagram that illustrates processing of the hosted pre-compilation system to perform a host-initiated recompile of dependent modules, in one embodiment. FIG. 3 described a module load initiated by a runtime. FIG. 4 describes a case in which the host has determined that it wants to recompile a binary image out-of-band (e.g., on some host-determined schedule). Beginning in block 410, the system receives an input module from the host, wherein the input module provides the software code to be compiled. The input module may include a module storing intermediate language code that was previously compiled from one or more programming language source files and/or resource files. Continuing in block 420, the system receives an output location at which to store a compiled binary image generated from the input module. The output location is a location managed by the host for storing binary images used by the host (e.g., a file system directory associated with the host).

Continuing in block 430, the system receives a binary image generation request from the host. The request may include one or more compilation settings, security configuration parameters, optimization settings, and other information for generating the binary image from the input module. Continuing in block 440, the system determines one or more host environment settings that affect output code associated with the compiled binary image. Some environments, such as MICROSOFT™ .NET provide a trust model that can lead to different binary output depending on a trust level associated with a module. For example, the environment may perform additional security checks for APIs called by an untrusted module than for a trusted module. Continuing in block 450, the system locates any module dependencies that affect output code associated with the compiled binary image. For example, the module may include import instructions that specify related code stored in dependent modules. The system may use this information during compilation of the subject input module.

Continuing in block 460, the system builds a binary image from the received input module using the determined host environment settings and other information. Building may include converting intermediate code to associated machine native instructions. Intermediate code may run on a virtual machine whereas native instructions run on a physical processor (e.g., a central processing unit (CPU)). Building may produce optimized code based on a detected processor or other environment settings. Continuing in block 470, the system stores the built binary image at the host-provided output location for subsequent execution. The host may maintain a cache of built binary images for use in response to module load or execution requests. The system informs the host when a particular binary image is needed, and the host can provide any previously built image from the output location.

Continuing in block 480, the system notifies the host that the binary image generation completed. If the build process encountered an error, then the system may provide the error in the notification and inform the host that no binary image was produced. For successful builds, the host may use the notification to trigger other actions, such as executing an application in the hosted environment. After block 480, these steps conclude.

In some embodiments, the hosted pre-compilation system only precompiles some modules. The decision of whether to precompile a particular image is a performance decision left to the host. The host may have knowledge that affects the decision, such as particular modules being updated frequently leading to a decision not to precompile and instead to compile at each use. For other modules, such as those that infrequently change, the host may opt to precompile so that a binary image is available and does not unduly delay execution of a program that uses the module.

In some embodiments, the hosted pre-compilation system allows the host to choose synchronous or asynchronous compilation. For some modules, the host may decide to wait for compilation to complete, such as situations where the host has an immediate use for executing the module. In other cases, the host may allow the compilation component to complete at its own schedule and notify the host when compilation is complete (e.g., asynchronously).

In some embodiments, the hosted pre-compilation system receives an indication from the host to discard compiled images when an application changes. The host controls the image data store and may specify points in time to invalidate the cache and purge the compiled binaries. In some embodiments, the host may lazily discard images by waiting until the next request for the image, determining if it is time to discard the image, and, if so, discarding the image.

In some embodiments, the hosted pre-compilation system determines where to look for compiled binary images based on a privilege level of an application. For example, the system may use a host-provided or application-provided location for modules that are less privileged, but allow more trusted applications to place compiled images in a global assembly cache (GAC) or native image cache (NIC). Placing more compiled images in the GAC allows more applications to share the same compiled binary images (thus saving disk space and memory usage if the image can be commonly mapped in memory). However, placing images in the GAC can introduce security risks if an application places an image there that does not perform as expected. Thus, the system may prefer the GAC for trusted applications, but use application-supplied caches for less trusted applications.

In some embodiments, the hosted pre-compilation system provides extra information to the host application. For example, the system may allow the host to perform name resolution and request particular versions of modules. A host that wants to use a particular version of a module can then ask for that module. The system tracks full dependency versions and may have multiple versions of the same native image stored on a system at the same time to satisfy host requests.

In some embodiments, the hosted pre-compilation system allows the host application to disable or further control validation. Validating images can be a time consuming process, and some hosts (e.g., MICROSOFT™ SILVERLIGHT™ OR MICROSOFT™ ASP.NET) may want to skip all or part of validation for certain well-defined situations. Accordingly, the host may configure the system to skip validation or to notify the host to determine whether to perform validation in a particular case (e.g., during load of a particular module).

From the foregoing, it will be appreciated that specific embodiments of the hosted pre-compilation system have been described herein for purposes of illustration, but that various modifications may be made without deviating from the spirit and scope of the invention. Accordingly, the invention is not limited except as by the appended claims.

We claim:

1. A computer-implemented method for loading a module in an intermediate language for use by a hosted environment, the method comprising: receiving a module load request;
    determining whether the module is being loaded within a hosted environment, wherein the hosted environment is isolated from a primary environment of a host machine, and wherein the hosted environment is an isolated environment configured to control security settings, resources accessing, and impose application restrictions;
    notifying the hosted environment of an attempt to load a module in the hosted environment;
    receiving a location for storing a binary image related to the loading module, wherein the location is managed by the hosted environment;
    validating the stored binary image accessed at the received location prior to loading the binary image for execution;
    upon determining that the stored binary image is invalid, notifying the hosted environment that the stored binary image is invalid;
    receiving a host request to generate a new binary image version of the loading module;
    storing the new binary image at a host-provided location; and
    preparing the image for execution, wherein the preceding steps are performed by at least one processor.

2. The method of claim 1 wherein receiving the module load request comprises receiving an indication of a user executing an application, wherein the request includes a file system path to the module.

3. The method of claim 1 wherein determining whether the module is being loaded in a hosted environment comprises detecting that the hosted environment configured one or more settings within a runtime that identifies the environment as hosted.

4. The method of claim 1 wherein notifying the hosted environment of the attempt to load the module comprises calling a callback function registered by the host environment and identifying the module being loaded.

5. The method of claim 1 wherein receiving the location for storing the binary image comprises receiving the location of a host-provided cache managed by the hosted environment.

6. The method of claim 1 wherein receiving the location for storing the binary image allows the host environment to isolate images suitable for use in the hosted environment from other system-wide images.

7. The method of claim 1 wherein validating the stored binary image comprises determining settings under which the binary image was compiled and comparing the settings to current settings.

8. The method of claim 1 wherein validating the stored binary image comprises determining version information of the stored binary image and comparing the version information to that of the module.

9. The method of claim 1 wherein notifying the hosted environment that the stored binary image is invalid comprises calling a callback function registered by the host environment and indicating that the module needs to be compiled.

10. The method of claim 1 wherein receiving the host request to generate the new binary image comprises receiving the request at later, host-determined time after the notification that the stored binary image is invalid has been processed.

11. The method of claim 1 wherein receiving the host request to generate the new binary image comprises invoking a compiler to produce the image from the loading module.

12. The method of claim 1 wherein storing the new binary image comprises storing the binary image in a host cache managed by the host.

13. A computer system for pre-compiling hosted application code, the system comprising:
- a processor and memory configured to execute software instructions;
- a host detection component configured to determine whether application code is running in a hosted environment as opposed to a primary environment of a host machine, wherein the hosted environment is isolated from the primary environment of the host machine, and wherein the hosted environment is an isolated environment configured to control security settings, resources accessing, and impose application restrictions;
- a host interface component configured to provide an interface through which the hosted environment can invoke the system to compile images from modules storing intermediate language code;
- a host notification component configured to notify a host upon occurrence of one or more events related to modules used by the host environment;
- an image receiving component configured to receive from the host a path to a location that contains one or more previously compiled binary images;
- an image validation component configured to determine whether a received binary image is a valid compiled version of a module related to the hosted environment prior to loading the binary image for execution;
- a compilation component configured to compile software code written into a particular language into machine executable binary instructions;
- an image storage component configured to store compiled binary images under control of the hosted environment; and
- an image data store configured to provide a storage facility for caching compiled binary images related to the hosted environment.

14. The system of claim 13 wherein the host interface component is further configured to provide an application programming interface (API) through which the host can specify a path to a specific file or directory of files to be compiled from an intermediate language to native binary images for a particular computer on which the binaries are to be run.

15. The system of claim 13 wherein the image validation component further is configured to receive a configuration setting that indicates whether to perform validation and wherein the host notification component is further configured to notify the host upon determining that a previously compiled binary image is no longer valid as a result of performing validation.

16. The system of claim 13 wherein the host notification component is further configured to notify the host upon loading a module for use with the host so that the host can provide a path to a host-controlled image cache that stores compiled binary images.

17. The system of claim 13 wherein the image receiving component is further configured to isolate the host from any machine-wide cache provided by a platform runtime.

18. The system of claim 13 wherein the compilation component is further configured to retrieve previously compiled intermediate code from which to generate native code.

19. A hardware computer-readable memory device comprising instructions for controlling a computer system to perform a host-initiated recompile of a dependent module that executes in a hosted environment, wherein the instructions, upon execution, cause a processor to perform actions comprising:
- receiving an input module from the host, wherein the input module provides software code to be compiled;
- receiving an output location at which to store a compiled binary image generated from the input module;
- receiving a binary image generation request from the host;
- determining one or more host environment settings that affect output code associated with the compiled binary image;
- building a binary image from the received input module using the determined host environment settings;
- storing the built binary image at the host provided output location for subsequent execution, wherein the subsequent execution occurs in the hosted environment as opposed to a primary environment of the host, and wherein the hosted environment is isolated from the primary environment of the host, and the hosted environment is an isolated environment configured to control security settings, resources accessing, and impose application restrictions;
- notifying the host that the binary image generation completed when the build was successful; and
- notifying the host that the binary image generation was not successful when building the binary image encounters an error.

20. The device of claim 19 wherein the input module comprises a module storing intermediate language code that was previously compiled from one or more programming language source files and resource files.

* * * * *